(12) United States Patent
Burd

(10) Patent No.: US 9,469,402 B2
(45) Date of Patent: Oct. 18, 2016

(54) COMPACT CHECK VALVE FOR AIRCRAFT GALLEY PLUMBING SYSTEM

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/676,062

(22) Filed: Apr. 1, 2015

(65) Prior Publication Data

US 2015/0203204 A1 Jul. 23, 2015

Related U.S. Application Data

(63) Continuation of application No. 13/898,108, filed on May 20, 2013, now Pat. No. 9,004,093.

(60) Provisional application No. 61/650,048, filed on May 22, 2012.

(51) Int. Cl.
| | |
|---|---|
| *G05D 11/00* | (2006.01) |
| *B64D 11/02* | (2006.01) |
| *B64D 11/04* | (2006.01) |
| *F16K 17/04* | (2006.01) |
| *F16K 15/06* | (2006.01) |
| *F16K 31/122* | (2006.01) |

(52) U.S. Cl.
CPC .............. *B64D 11/02* (2013.01); *B64D 11/04* (2013.01); *F16K 15/063* (2013.01); *F16K 15/066* (2013.01); *F16K 17/048* (2013.01); *F16K 31/1221* (2013.01); *Y10T 137/2617* (2015.04); *Y10T 137/2663* (2015.04); *Y10T 137/7922* (2015.04); *Y10T 137/87877* (2015.04)

(58) Field of Classification Search
CPC ................ Y10T 137/6906; Y10T 137/87877; B64D 11/04; E03C 1/106; F16K 11/105
USPC ......... 137/115.16, 115.17, 118.06, 598, 883, 137/899.2; 251/149–149.9
See application file for complete search history.

(56) References Cited

U.S. PATENT DOCUMENTS

| | | | |
|---|---|---|---|
| 1,534,406 A * | 4/1925 | Martocello | F25C 1/18 137/544 |
| 2,621,719 A | 12/1952 | Eaton et al. | |
| 3,276,465 A | 10/1966 | Wyckoff | |
| 3,462,117 A | 8/1969 | Lind | |

(Continued)

*Primary Examiner* — John K Fristoe, Jr.
*Assistant Examiner* — Reinaldo Sanchez-Medina
(74) *Attorney, Agent, or Firm* — Fulwider Patton LLP

(57) ABSTRACT

A check valve for an aircraft galley plumbing system having a valve body including an inlet for a potable water supply line, and first and second outlet ports leading to a distribution manifold. In a preferred embodiment, quick disconnects that include reverse flow inhibitors seal the valve's output ports. A vertical channel extends through the valve body for draining water through the valve, which is coupled to a pressure line connection port that exerts pressure from the aircraft's pressure system. A piston reciprocating across the vertical channel and biased by a spring is in fluid communication with the pressure line connection port, such that when water pressure is introduced from a pressure line to the connection port of sufficient pressure to collapse said spring, the piston blocks said channel, and when the water pressure is insufficient to collapse said spring then the piston retracts to open said channel.

4 Claims, 3 Drawing Sheets

(56) References Cited

U.S. PATENT DOCUMENTS

| | | |
|---|---|---|
| 4,190,071 A | 2/1980 | Dean et al. |
| 4,476,889 A * | 10/1984 | Haynes .................... B60S 3/04 137/116.3 |
| 5,232,010 A | 8/1993 | Rozenblatt et al. |
| 5,415,531 A | 5/1995 | Cavanaugh |
| 5,429,149 A | 7/1995 | Mittell et al. |
| 5,518,026 A | 5/1996 | Benjey |
| 5,769,124 A | 6/1998 | Ehrhardt |
| 6,776,183 B1 | 8/2004 | Brooker et al. |
| 7,243,684 B1 * | 7/2007 | Chen ......................... F16K 1/12 137/883 |
| 8,444,401 B2 | 5/2013 | Borst et al. |
| 9,004,093 B2 * | 4/2015 | Burd ..................... B64D 11/04 137/115.16 |
| 2005/0063846 A1 | 3/2005 | Maeda |
| 2007/0157970 A1 | 7/2007 | Horng et al. |

\* cited by examiner

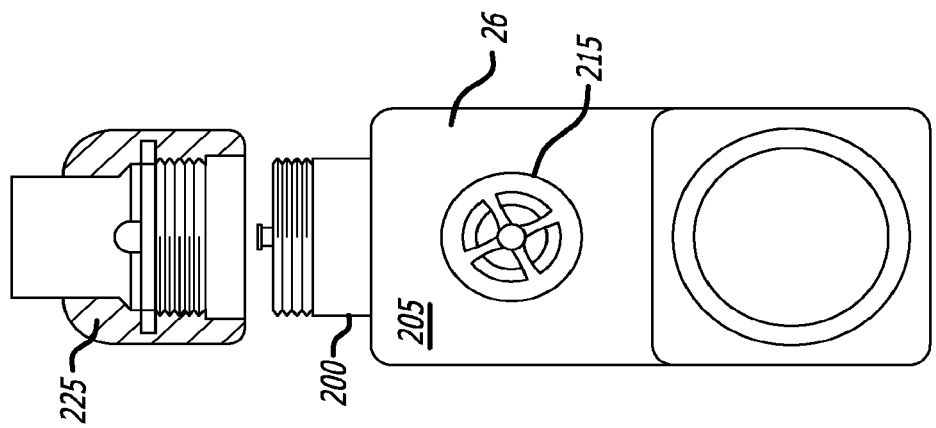
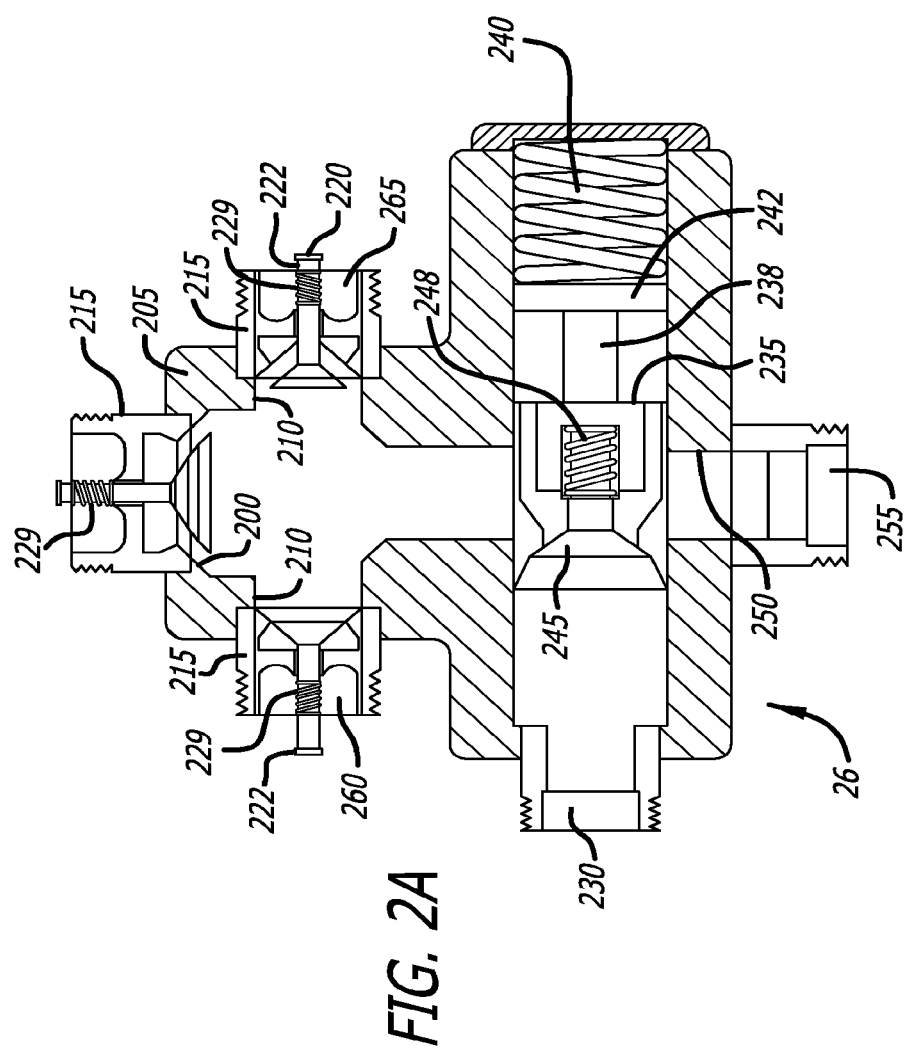
FIG. 2A
FIG. 2B

COMPACT CHECK VALVE FOR AIRCRAFT GALLEY PLUMBING SYSTEM

CROSS-REFERENCES TO RELATED APPLICATIONS

This continuation application is based on U.S. Ser. No. 13/898,108, filed on May 20, 2013 which claims priority from U.S. Application No. 61/650,048, filed May 22, 2012, incorporated herein by reference in its entirety.

BACKGROUND

One important system on a commercial aircraft is the galley plumbing system. Both potable and waste water must be stored, circulated, and collected on the aircraft via the plumbing system. On a commercial aircraft, potable water is used for multiple applications, including drinking water, beverages such as coffee and tea, and cooking (steam ovens, rice boilers etc.), and as a result must meet certain safety regulated requirements. That is, to ensure that it fit for human consumption, potable water available on an aircraft has to meet certain minimum health and safety standards. This is partially accomplished with aggressive filtering, which also improves the taste and smell, and removes impurities and harmful bacteria. The aircraft plumbing system encompasses all aspects of water usage on a galley, and includes its associated hardware and components as well as the other galley equipment, either consuming or producing water.

To meet the requirements of potable water, galley plumbing systems must pass design requirements specified by the aircraft manufacturers and proving tests to ensure that the potable, waste and foul water systems remain separated and that no cross contamination can occur. Also, when the aircraft shuts down after completion of a flight, or for longer periods of storage or maintenance, all of the systems must be capable of draining completely to evacuate all residual water so as to eliminate all retained water that could potentially become contaminated or breed bacteria. To this end, the plumbing system must be capable of gravitational draining, i.e., receiving air into the system to cause rapid displacement and removal of any trapped water.

It is common practice in the airlines for potable water that has passed through the water filter of the plumbing system to be regarded as waste water. However, recent changes in policy by aircraft manufacturers that are driven by the need to conserve water, has led to requirements that potable water only becomes waste water when it has entered the galley sink. In view of this, it is possible to reclaim potable water by draining all other water fed devices including water boilers, faucets, ovens, filters, etc. into the fresh water tanks. In addition, at the resumption of service, the potable water supply circuit must be capable of being filled automatically without manual assistance, and all sections that may potentially trap air must be capable of self-venting. When filling the potable water circuit, it is important to remember that pressures vary depending on the aircraft and design.

When filling the potable water circuit, the pressure varies depending on the aircraft and design. From a safety perspective, the system requires that hot water backflow from the GAINs to the faucet is prevented. Hydraulic pressure reduction is also desirable to improve flow and increase water consumption capacity.

SUMMARY OF THE INVENTION

The present invention is a flow control valve that allows the installation of a full potable/waste/vacuum plumbing system in a reduced footprint for a wet/refrigerated aircraft galley. The valve can be closed by the pressure of the aircraft's potable water supply, isolating a portion of the circuit that supplies the monument's galley insert equipment (GAIN) allowing them to function normally (i.e. to consume water) as part of the normal in-flight catering service provided by airlines for commercial aircraft passengers. Additionally, the valve has removable self-closing connection points or "quick disconnects" that allow sections of the potable water system to be isolated while still connected to the aircraft main supply. The valve can be fitted with an optional anti back flow prevention device at the drainage line connection, and the valve provides automatic drain down of the monument's potable water system.

The operation of the valve is fully automatic, i.e. no manual intervention, permitting venting during the filling of the galley potable water system and flushing of the waste water system until the entire water supply reaches a high enough pressure to close the valve. When an aircraft has completed a flight and the aircraft systems are turned off, the drop in potable water pressure allows the valve to open, letting the previously isolated water supply lines drain through the valve, avoiding the risk of contamination from water that may remain trapped in the system.

Drain down for both the potable water and waste water may be into the waste water tank, or into separate tanks depending on the A/C system installed, a back flow surge being prevented from entering the potable water system, or reaching the sink by an air stop valve. In a preferred embodiment, the foul water system is not connected to the valve of the present invention in any way. A manually operated drain down override may also be fitted to the valve.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 2*a* is a cross sectional view of a first preferred embodiment of the valve of the present invention;

FIG. 2*b* is a side view of the valve of FIG. 2*a*; and

DETAILED DESCRIPTION OF THE PREFERRED EMBODIMENTS

Figure 1:
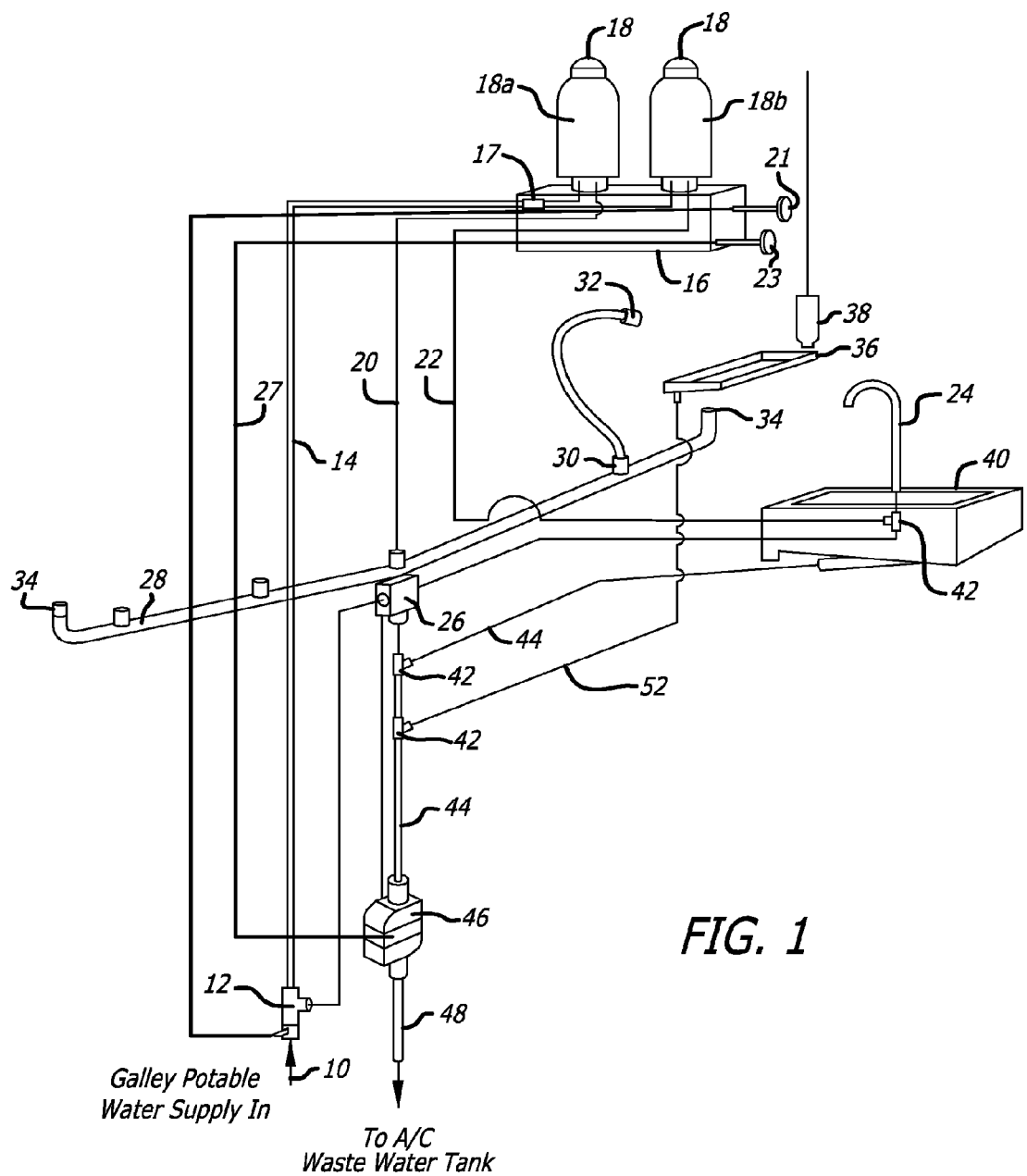
FIG. 1 is a is a schematic illustration of an exemplary galley utilizing the air stop valve of the present invention.

The plumbing system as shown in FIG. 1 illustrates a schematic diagram for a compact integrated plumbing system designed for use in a reduced foot print refrigerated/wet galley. Water is provided via a bottom fed potable water delivery system where the water supply originates from the bottom of the monument, although similar systems include water fed from above. The invention works well with either system, as well as other plumbing systems. Potable water (indicated by arrow 10) enters the plumbing system via a "T" valve 12 incorporating a remotely operated shut off valve. The main feed 14 supplies the water distribution/filter block 16 through a two way valve 17, where it is filtered using a selected filtration method such as, for example, a spin on type water purification cartridges that incorporate self-venting units 18. Preferably two or more filters 18 are used to reduce back pressure in the system and to allow airlines to select different levels of filtration, a GAINS supply line water filter 18*a* and a faucet supply line water filter 18*b*. One line 20 connected to the filter 18*a* supplies the galley insert equipment (GAINS) such as coffee makers, steam ovens, etc., and the other line 22 from the filter 18*b* supplies the fresh water faucet 24. The distribution block 16 includes a remote emergency potable water shut off valve 21 and a backflow prevention valve manual override 23 controlled by a cable 27.

The second branch of the Tee valve 12 supplies pressurized water to the compact pressure check valve 26 at a pre-defined pressure. This check valve 26 closes the valve 12, preventing drain down from the GAIN water distribution manifold 28. The distribution manifold 28 supplies potable water via quick disconnect fittings 30. The GAINS are connected to the manifold 28 by flexible hoses 32. The manifold 28 also preferably incorporates self-venting devices 34 to aid the (potable water) filling process, as does the faucet 24. Water from the faucet 24, from GAIN drip trays 36 via condensate drainage catch pots 38, and any condensate from galley air chiller units, is disposed of via drain line 52 to waste line 44 via Tee piece 42. Drainage of waste water entering the sink is accomplished via a Tee piece 42 in the waste water drain line 44 and through a compact, backflow prevention device or air stop valve 46, which operates under a partial vacuum. A manual over ride is remotely connected to the distribution filter block 16. Both the potable drain line 52 and waste water line 44 drain down into the aircraft waste water tank via line 48.

In the foregoing plumbing system, all of the waste water drains downward to the aircraft waste water tank (not shown). Filtered water is distributed from the filter 18*a* to the GAINS manifold 28 and then to the GAINS via flex hose connections 32. The system is self-venting through various self-venting devices 34, the water filters 18 and faucet 24. All standing water can be quickly vented to prevent contamination of the system and comply with regulation for potable water systems.

FIG. 2 illustrates a first preferred embodiment of a cutaway multi-port pressure valve 26 of the present invention. In this embodiment, the potable water supply is fed into the multi-port valve 26 at the inlet port 200, which is integrally formed in the valve body 205. Adjacent the inlet port 200 is a pair of diametrically opposed exit ports 210, each exit port as well as the inlet port are fitted with male quick disconnects 215 that include a one way poppet valve 220 to cause self-sealing of the valve. Each poppet valve 220 is held open when the female quick disconnect connector 225 is attached, where the female quick disconnect connector extends the poppet valve 220 via the extension of a stem 222 to provide a path through the ports 210. If there is no female coupling, the stem remains extended by virtue of a biasing by a spring 229 and the poppet is closed and no flow will pass through the port. In FIG. 2*a*, the poppet valve 220 on the left hand side is shown in the closed configuration, whereas the top and right hand poppet valves 220 are shown in the open configuration.

The check valve 26 actuates when the aircraft's potable water supply is turned on. The automatic closure function operates via a direct feed from the aircraft plumbing system to the pressure line connection point 230. During start-up, the potable supply into the valve 26 initially allows a portion of water to pass through the valve 26 to flush the system. As the pressure increases, the check valve's piston 235 is forced against the bias of valve spring 240 by the pressure at the pressure line port 230 until the piston blocks the drainage line port 255 as shown in FIG. 2*a*. In this configuration, the pressure from the pressure line 230 fully compresses the valve spring 240, thereby closing off the port 250 to the drainage line connection point 255. The closure of the drainage line connection point 255 causes the potable water to be distributed through the ports 210 to the distribution manifold where it is used by the galley equipment via connections 260 and 265. That is, the check valve piston 235 closes the valve 26 allowing potable water supply to the GAINS while prohibiting drain down through the exit port 250.

Figure 3:
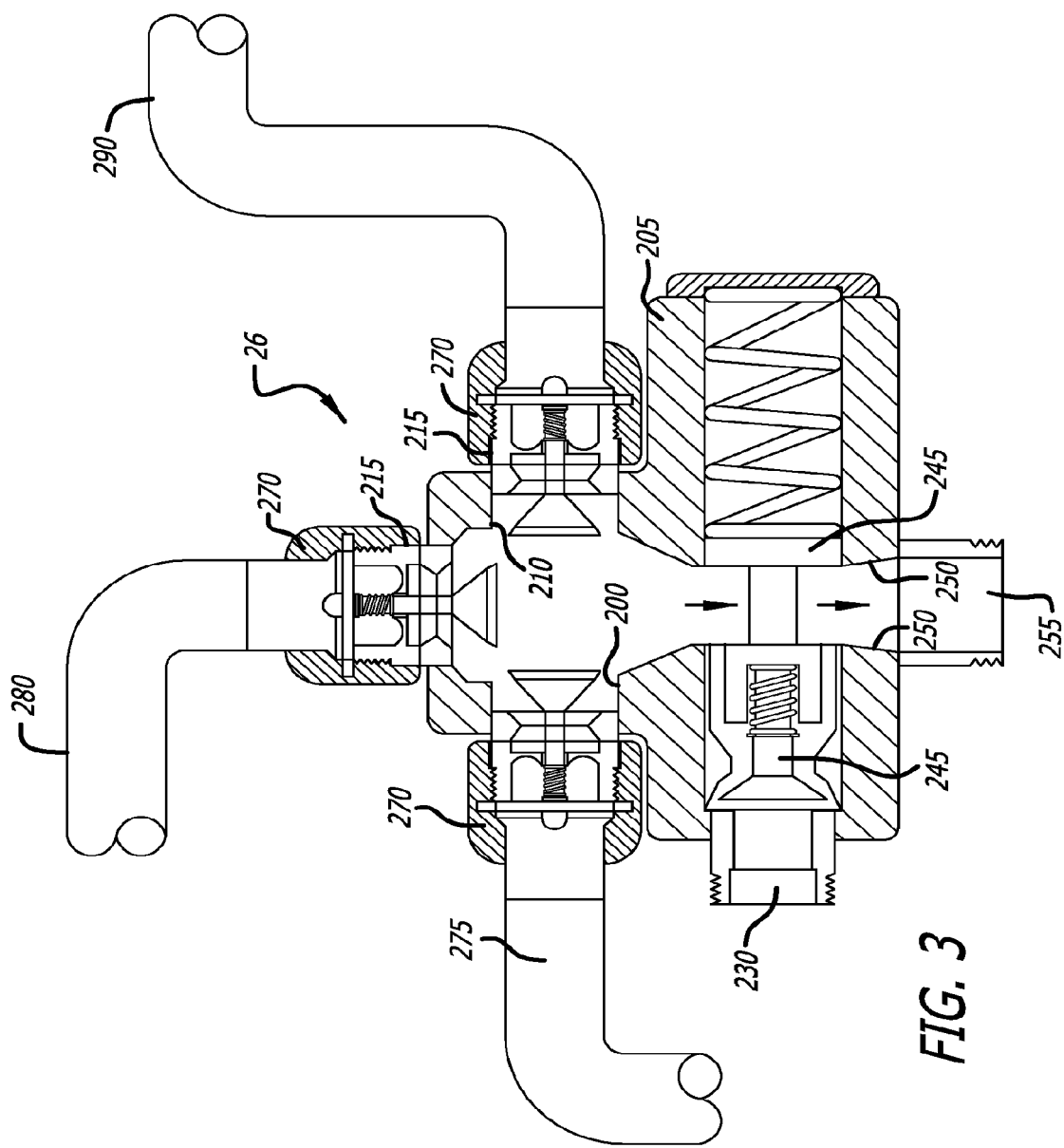
FIG. 3 is an alternate embodiment of the valve of the present invention.

The piston 235 itself includes a secondary poppet 245 biased by a secondary spring 248, such that the poppet when not pressurized remains in the open position (see FIG. 3). However, as the pressure line pressurizes the valve 26, the poppet 245 is closed by the force of the pressure against the spring's bias, preventing water from leaking past the poppet 245 and through the piston, causing the valve 26 to close (See FIG. 2*a*). Once the pressure is relieved, the piston will move away from the exit port 250 and along drain down to occur, such as when the aircraft undergoes maintenance or a dedicated drainage. The piston 235 includes a rod 238 that connects to a plate 242, where the plate 242 engages the spring 240. The gap between the plate 242 and the end of the piston 235 allows water to pass through the channel 250 when the piston is retracted from the channel. The spring 240 can be selected to ensure that the valve will close under the desired pressure conditions of the system, and open reliably when the pressure is diminished.

FIG. 3 illustrates a slightly modified version of the embodiment of FIG. 2, where the potable water inlet 270 is on the side to accommodate a bottom fed system. Larger diameter manifold connection quick disconnect fittings 270 are provided for greater water flow capacity in this bottom fed system. Potable supply line flexible conduit 275, and manifold distribution flexible conduit 280 are switched in this embodiment, whereas flexible conduit 290 to the right hand distribution manifold is unchanged. As discussed above, the pressure in FIG. 3 through the pressure line connection point 230 has reduced to a level that has allowed the check valve piston 245 to return to the rest position, opening the port 250 to the drainage line connection 255, and allowing drain down of the potable water supply manifolds. Also, the pressure line drainage poppet 245 is shown in the open position, which results from the diminished pressure in the valve. In this bottom fed configuration, the pressure check piston poppet valve 245 may be eliminated as the pressure line drainage will be in the reverse direction of supply. Further, in both top and bottom fed potable water supply systems where the faucet is drained along a separate line from the feed (depending on position and height), a T-piece adapter with a one way valve is employed to prevent reverse flow (supply) from the distribution manifold.

A key advantage of the present invention is that it simplifies an aircraft galley plumbing system by eliminating the need for separate filling and drainage loops for the potable water supply system on galley monuments that consume water. Moreover, the invention is fully automatic under normal operational conditions and the valve allows self-flushing of stale residual water that may be trapped during operational start up. The invention also allows for disconnection of the respective parts of the galley system or replacement of faulty GAINS while the aircraft system is under pressure. Using the present invention, a water supply connection can be achieved from above or below the monument, as well as an option of draining into waste only or separate waste and potable water tanks. The valve permits installation of a full plumbing system in a reduced foot print (34" to 35") galley due to its compact size, and hot water back flow risks from water consuming GAINS, such as water boilers, are eliminated. Finally, the present invention allows separate filtration for GAIN and faucet water feeds and reduces back pressure in the system.

It will become apparent from the foregoing that while particular forms of the invention have been illustrated and described, various modifications can be made without departing from the spirit and scope of the invention. Accordingly, it is not intended that the invention be limited, except as by the appended claims.

I claim:

1. A four-way check valve for an aircraft galley plumbing system, comprising:
    a valve body including an inlet on an upper surface for a potable water supply line;
    first and second outlet ports extending perpendicular to the inlet, including quick disconnect fittings with reverse flow inhibitors to automatically seal the valve when no conduit is connected to the outlet ports, the reverse flow inhibitors managed by a spring and a detector for detecting the presence of a conduit;
    a pressure line connection port that communicates a fluid pressure to the four way check valve;
    a fluid outlet opposed to the inlet at a lower surface of the valve body; and
    a piston actuated by the fluid pressure, whereby the piston transversely occludes the fluid outlet when a pressure overcomes a first piston spring, the piston including a poppet therein that is biased by a second spring, and the piston spring and the piston poppet spring are concentrically aligned.

2. The check valve for an aircraft galley plumbing system of claim 1, wherein the reverse flow inhibitors are poppets.

3. The check valve for an aircraft galley plumbing system of claim 1, wherein the first and second outlet ports are diametrically opposed to each other.

4. A four-way check valve for an aircraft galley plumbing system, comprising:
    a valve body including an inlet on an upper surface for a potable water supply line;
    first and second outlet ports extending perpendicular to the inlet, including quick disconnect fittings with reverse flow inhibitors to automatically seal the valve when no conduit is connected to the outlet ports, the reverse flow inhibitors managed by a spring and a detector for detecting the presence of a conduit;
    a pressure line connection port that communicates a fluid pressure to the four way check valve;
    a fluid outlet opposed to the inlet at a lower surface of the valve body; and
    a piston actuated by the fluid pressure, whereby the piston transversely occludes the fluid outlet when a pressure overcomes a first piston spring, the piston including a poppet therein that is biased by a second spring, wherein the poppet spring is mounted inside an annular recess.

* * * * *